United States Patent Office 2,853,835
Patented Sept. 30, 1958

2,853,835

MACHINE FOR MOLDING GLASS ARTICLES

Benjamin F. Tallent, Toledo, Ohio, assignor to Owens-Illinois Glass Company, a corporation of Ohio Application December 5, 1955, Serial No. 550,926

1 Claim. (Cl. 49—37)

My invention relates to a machine for molding glass articles by a press molding operation. The invention is embodied in and forms a part of a machine of the type in which molding units are mounted on a rotatable carriage and brought in succession to a press molding station where a press plunger carrying a molding element or head is operated for press molding the glass articles. The machine may be used for molding hollow glassware or articles of rectangular outline and having an annular or cylindrical wall or other shaped peripheral rim portion formed with and extending upwardly from the bottom or body portion of the article.

As herein illustrated and described the machine is adapted for molding face plates such as used with television picture tubes but may be adapted for molding various other forms of ware. In machines of the type above referred to each mold unit on the mold carriage comprises a bottom or body mold and a cooperating annular mold or ring, known in the trade as a ring shell. The ring shell, mounted for up-and-down movement, is seated on the bottom mold while the press plunger molding head is moved downward and molds a charge of molten glass to form the molded article.

The present invention provides a novel construction in which a single ring mold or ring shell cooperates with each of the body molds on the carriage in succession. The ring shell is operatively connected with the press plunger for up-and-down movement therewith.

An object of the invention is to provide a construction in which a better heat balance is maintained in the ring shell.

A further object of the invention is to provide a safety feature by eliminating the usual manually operated shell lifting device and burner used for heating the shell.

A further object of the invention is to provide greater uniformity of the articles molded by the ring shell. In molding face plates for picture tubes the rims with their sealing surfaces are commonly molded by ring shells. The present invention by the use of a single ring shell provides a greater uniformity in the sealing edge dimensions than is found possible with prior art machines in which individual ring shells are used with all of the mold units on the mold table.

Other objects of the invention and the precise nature thereof will appear more fully hereinafter.

Referring to the accompanying drawings.

Figure 1:
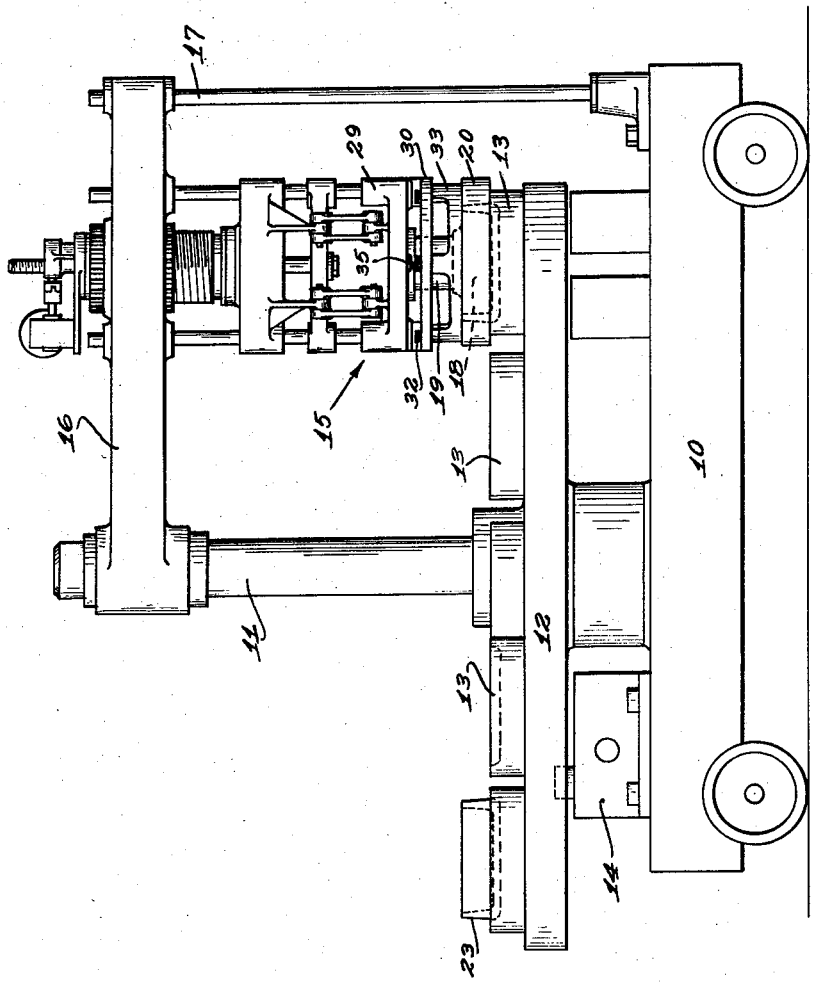
Fig. 1 is an elevational view of a press molding machine in which the present invention is embodied.

Referring to Fig. 1, the operating parts are mounted on a machine base 10 from which rises a vertical standard 11. A mold carriage comprising a table 12 is mounted for rotation about the axis of the standard 11. Molding units 13 are mounted on the mold carriage 12 and may be arranged in an annular series or circle thereon. The carriage is rotated intermittently, step by step, by a conventional form of carriage driving means 14, thereby bringing each of the mold units 13 in succession to the press molding station.

The press plunger mechanism 15 is supported in a stationary framework including a horizontal frame member 16 attached at one end to the standard 11 and at its other end to upright supporting rods 17. The press plunger 19 is movable up and down by a fluid operated or hydraulic motor in a conventional manner and includes a convex molding head 18 or body mold for press molding the charges of molten glass within the concave bottom molds or body mold units 13, the top edge of which terminates in a surrounding rib.

Figure 2:
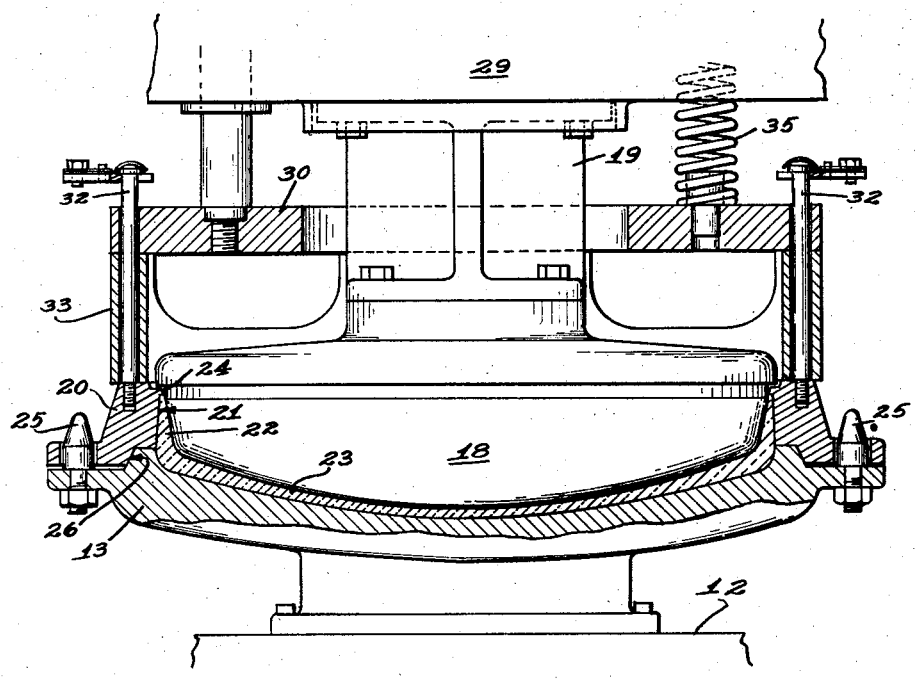
Fig. 2 is a sectional elevation at the press molding station, showing the press plunger lowered to molding position.

A ring shell or mold 20 is mounted for up-and-down movement with the press plunger and for limited up-and-down movement relative to the plunger as presently described. The ring shell when in its lowered position (Fig. 2) seats on the bottom mold 13 with the inner surface 21 of the ring in register with and forming an extension of the molding surface of the bottom mold 13. The ring 20 thus cooperates with the rib of the body mold 13 to define and serves to mold the major portion of the outer surface of the rim or flange 22 of the molded face plate 23. The ring 20 is also formed with an overhanging ledge 24 for molding the sealing surface of the face plate. The ring shell when lowered is guided (and centered on the mold bottom 13) by upstanding guide elements or tapered pins 25. The bottom side of the ring shell is formed with a frusto-conical tapered surface 26 to engage a correspondingly tapered surface of the bottom mold 13 for accurately centering the ring thereon.

The press plunger mechanism includes a frame 29 which serves as a carrier for the mold assembly comprising the body mold 18 and the ring mold 20. The carrier 29 is mounted for up-and-down movement and the mold 18 is fixed thereto. A spring plate 30 is connected for movement up and down with the carrier 29 and for limited vertical movement relative thereto. The ring shell 20 is suspended from the spring plate 30 by vertical rods 32 which extend downward through openings in the plate 30 and a false ring 33 interposed between the spring plate and the ring 20. The lower ends of the rods 32 are screw-threaded into the ring 20. The bores in the plate 30 and ring 33 through which the rods 32 extend are of somewhat larger diameter than the rods, thus permitting the ring 20 to adjust itself to the bottom mold 13.

Figure 3:
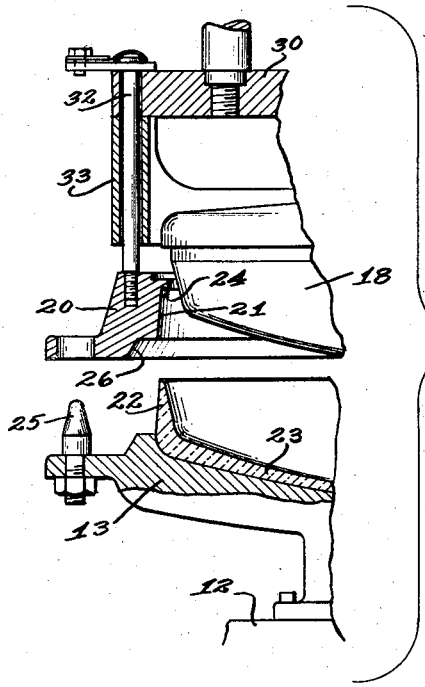
Fig. 3 is a fragmentary view of the parts shown in Fig. 2 with the press plunger and ring shell in their retracted position.

When the press plunger is in its lifted position, the ring shell 20 is spaced below the false ring 33 as shown in Fig. 3 with the ring shell suspended and spaced above the bottom plate 13. This permits the molded article 23 to be removed from the machine. When the press plunger is lowered, the ring shell 20 moves downward and seats on the bottom mold 13 in molding position before the molding head 18 contacts the charge of molten glass which has been placed in the bottom mold. After the ring shell is seated on the mold 13, the molding head 18 continues its downward movement and thereby molds the face plate 23 between the concave upper surface of the body mold and the convex exterior surface of the molding head. During this molding process the ring shell 20 has a yielding downward force applied to it by means of compression coil springs 35 interposed between the spring plate 30 and the frame 29. This spring pressure, transmitted through the false ring 33, serves also to hold the ring shell 20 in its lowered position when the plunger is retracted until the body mold 18 has been lifted out of contact with the molded face plate 23. Thereafter the continued upward movement of the plunger operates positively for lifting the ring shell 20 to clear the molded article.

Modifications may be resorted to within the spirit and scope of my invention.

I claim:

In an apparatus for molding a glass article of generally rectangular outline having a concave body portion surmounted by an upstanding peripheral rim, said apparatus including a body mold having a concave upper surface and a surrounding foreshortened rib for defining the exterior bottom surface of the article and a minor portion of the rim exterior surface, respectively, a molding head having a convex exterior surface for defining the interior bottom surface and the entire rim interior surface of said article, and means for moving said head downwardly to only partially telescope the head in said body mold and to confine an article-forming glass charge therebetween; the improvements of a ring mold seatably engageable with said body mold and extending peripherally of said molding head but in radially spaced relation thereto, said ring mold cooperating with said body mold rib to define the remaining major portion of said article rim exterior surface, and means on said body mold and said ring mold to guide the same into accurate, cooperative alignment, said means including mating frusto-conical surfaces on said ring mold and said body mold, respectively, and a plurality of peripherally spaced registering guide elements on said molds.

References Cited in the file of this patent

UNITED STATES PATENTS

| | | |
|---|---|---|
| 794,179 | Holston | July 11, 1905 |
| 1,501,868 | Said et al. | July 15, 1924 |
| 2,146,346 | Nelson | Feb. 7, 1939 |
| 2,490,450 | Lysle et al. | Dec. 6, 1949 |